United States Patent
Beaulieu et al.

(10) Patent No.: US 8,201,233 B2
(45) Date of Patent: Jun. 12, 2012

(54) SECURE EXTENDED AUTHENTICATION BYPASS

(75) Inventors: Stephane Beaulieu, Nepean (CA); David Silverman, Franklin, MA (US); Scott Fanning, Los Gatos, CA (US)

(73) Assignee: Cisco Technology, Inc., San Jose, CA (US)

( * ) Notice: Subject to any disclaimer, the term of this patent is extended or adjusted under 35 U.S.C. 154(b) by 1477 days.

(21) Appl. No.: 11/349,385

(22) Filed: Feb. 6, 2006

(65) Prior Publication Data
US 2007/0192842 A1 Aug. 16, 2007

(51) Int. Cl.
*G06F 17/30* (2006.01)

(52) U.S. Cl. .......... 726/9; 726/2; 726/20; 713/151; 713/168; 713/169; 713/170; 713/171; 380/277; 380/278; 380/279; 380/280; 380/281; 380/282; 380/283; 380/284; 341/67

(58) Field of Classification Search .......... 713/151, 713/168–171; 380/33, 277–284; 726/9, 726/20, 2; 341/67
See application file for complete search history.

(56) References Cited

U.S. PATENT DOCUMENTS

| | | | | |
|---|---|---|---|---|
| 6,377,691 | B1 * | 4/2002 | Swift et al. | 380/277 |
| 6,757,825 | B1 * | 6/2004 | MacKenzie et al. | 713/169 |
| 6,903,668 | B1 * | 6/2005 | Dror et al. | 341/67 |
| 6,941,326 | B2 * | 9/2005 | Kadyk et al. | 707/202 |
| 7,269,730 | B2 * | 9/2007 | Stirbu | 713/169 |
| 2005/0188194 | A1 * | 8/2005 | Fascenda | 713/155 |
| 2006/0236093 | A1 * | 10/2006 | Brok et al. | 713/151 |

OTHER PUBLICATIONS

Beaulieu et al., "Extended Authentication within IKE (XAUTH)", RFC 2026, pp. 1-20, Oct. 2001.

* cited by examiner

*Primary Examiner* — Thanhnga B Truong
(74) *Attorney, Agent, or Firm* — Weaver Austin Villeneuve & Sampson LLP

(57) ABSTRACT

Methods and apparatus are provided to allow Internet Key Exchange (IKE) phase 1 keying materials to be periodically refreshed in a secure manner without requiring user interaction. A client and server perform authentication and key exchange during set up of a secure connection. A token is passed to the client by the server during or after the initial user authentication phase. The token is stored both at the client and at the server. Instead of requiring user credentials, the token can be used to securely prove the identity of the client.

29 Claims, 5 Drawing Sheets

SECURE EXTENDED AUTHENTICATION BYPASS

BACKGROUND OF THE INVENTION

1. Field of the Invention

The present invention generally relates to security. More specifically, the present invention provides techniques and mechanisms for periodically refreshing keying material without possible session hijacking and without user intervention.

2. Description of Related Art

Various key exchange and authentication protocols such as Internet Key Exchange (IKE) allow entities to share information to generate a session key. IKE can be used to establish an Internet Protocol Security (IPsec) Virtual Private Network connection. IKE includes several phases. During IKE phase 1, two entities are generally authenticated and a matching IKE security association (SA) policy between the peers is negotiated to protect the IKE exchange. A key generation exchange such as a Diffie-Hellman exchange is performed to allow both entities to generate shared secret keys or session keys. During IKE phase 2, IPSec SA parameters protected by an existing IKE SA are negotiated. IPSec SAs are established and periodically renegotiated to ensure security. Optional additional Diffie-Hellman exchanges can also be performed.

To safeguard a connection against cryptographic attacks, the keying material needs to be periodically refreshed. Refreshing keying material typically entails prompting the user again for credential information in IKE. However, having to prompt the user again for credential information is annoying and problematic. The user may not be sitting in front of a terminal, or a user can be disconnected. To circumvent this situation, some vendors allow administrators to refresh keying material without prompting the user. However, this allows possible session hijacking attacks.

Current implementations for refreshing keying material associated with IKE SAs have limitations. Consequently, the techniques of the present invention provide mechanisms for allowing keying material to be periodically refreshed without possible session hijacking and without requiring user interaction.

SUMMARY OF THE INVENTION

Methods and apparatus are provided to allow Internet Key Exchange (IKE) phase 1 keying materials to be periodically refreshed in a secure manner without requiring user interaction. A client and server perform authentication and key exchange during set up of a secure connection. A token is passed to the client by the server during or after the initial user authentication phase. The token is stored both at the client and at the server. Instead of requiring user credentials, the token can be used to securely prove the identity of the client.

In one embodiment, a server for performing extended authentication is provided. The server includes a network interface and a processor. The network interface is operable to transmit to a client an extended authentication request associated with an IKE phase 1 exchange and receive from the client an extended authentication reply along with a token request. The processor is operable to generate a token. The token is maintained at the server and the client and provides proof of identity for the client.

In another embodiment, a technique for bypassing extended authentication during a rekey of a secure session is provided. An extended authentication request is received from a server at a client. The extended authentication request is associated with an IKE phase 1 exchange. An extended authentication reply is sent to the server. A token request is provided to the server. A token is received from the server during or after initial client authentication. The token is stored both at the client and the server and is operable to provide proof of identity for the client.

A further understanding of the nature and advantages of the present invention may be realized by reference to the remaining portions of the specification and the drawings.

BRIEF DESCRIPTION OF THE DRAWINGS

The invention may best be understood by reference to the following description taken in conjunction with the accompanying drawings, which are illustrative of specific embodiments of the present invention.

DETAILED DESCRIPTION OF SPECIFIC EMBODIMENTS

Figure 1:
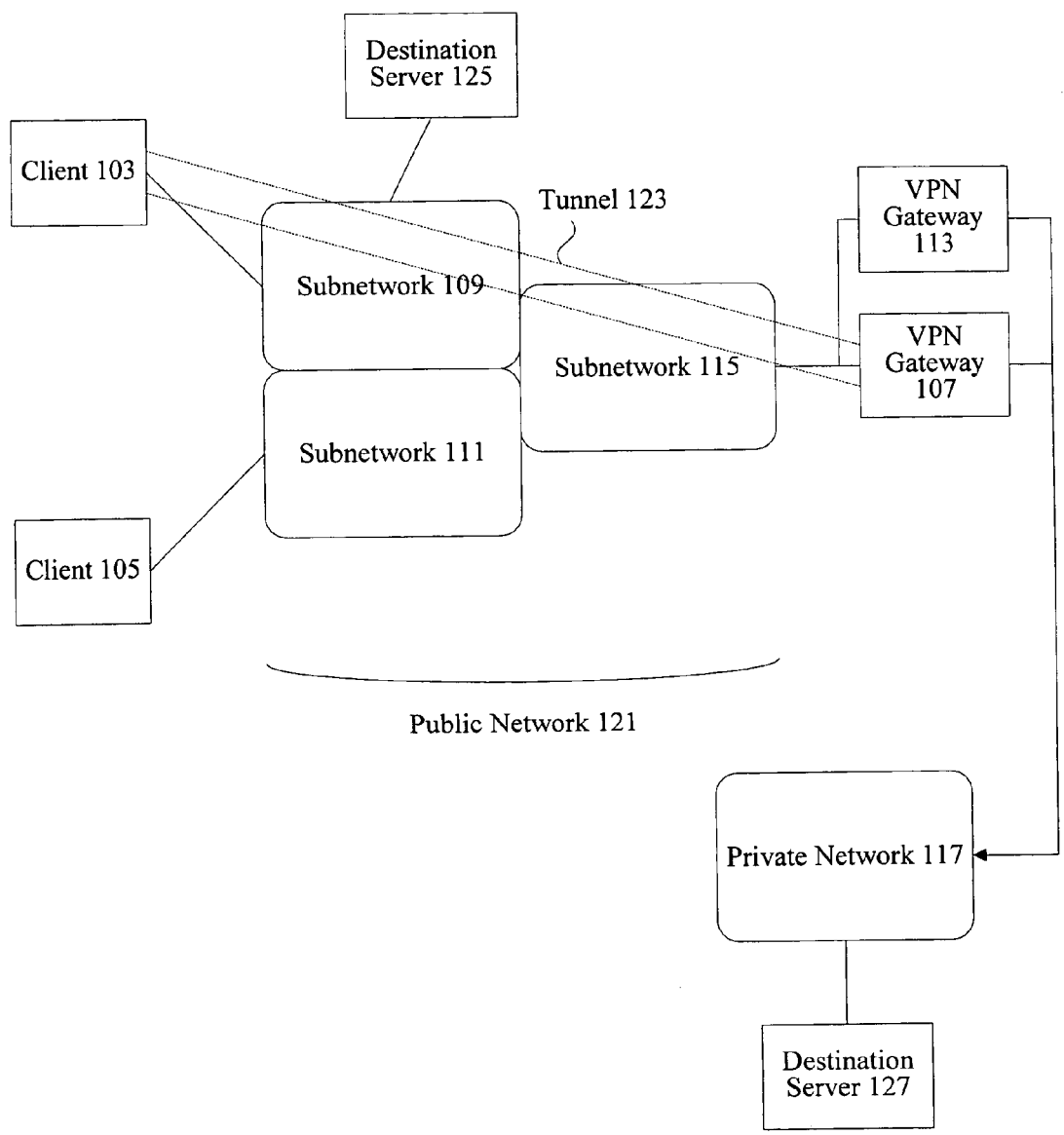
FIG. 1 is a diagrammatic representation showing one example of a system in which the techniques of the present invention can be used.

Reference will now be made in detail to some specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques of the present invention will be described in the context of Internet Protocol Security (IPsec) remote access virtual private networks (VPNs) using Internet Key Exchange (IKE). However, it should be noted that the techniques of the present invention can be applied to different variations and flavors of remote access and IKE. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Furthermore, techniques and mechanisms of the present invention will sometimes be described in singular form for clarity. However, it should be noted that some embodiments can include multiple iterations of a technique or multiple instantiations of a mechanism unless noted otherwise. For example, a processor is used in a variety of contexts. However, it will be appreciated that multiple processors can also be used while remaining within the scope of the present invention.

Virtual private networks (VPNs) allow remote network nodes such as telecommuters, clients, suppliers partners, or distant offices access to a private network such as a company network through a VPN gateway or server. Many VPN applications using Internet Protocol Security (IPsec) and Internet Key Exchange (IKE) to provide encryption and authentication between a client and a VPN gateway or server. The secure connection between a client and a VPN gateway or server is often referred to as a VPN tunnel. In many cases, a client accessing a private network through a VPN tunnel enjoys the same privileges and access capabilities as a client within the private network.

In many instances, a client and a VPN gateway or server negotiate a matching IKE SA policy and exchange information using public keys to generate shared secret keys or session keys. A user associated with the client computer typically also provides user credentials such as secure identifiers, username and password information, and/or biometric information to allow user authentication.

IKE version 1 provides that in order to safeguard a secure connection between a client and a server, the keying material used during IKE phase 1 is periodically refreshed. In some examples, it is desirable to periodically change session keys, for example, to ensure that an attack on a particular set of session keys does not yield all the data, but rather just a limited amount of data included in the time period between key refreshes. Refreshing keying material typically requires a user to provide user credentials. However, requiring user credentials is inefficient and problematic. The user may not be available to provide user credentials or could be momentarily disconnected. Some vendors allow administrators the ability to refresh the keying material without prompting the user. However, without user credentials reentered by a user, it would be possible for an unscrupulous user to come in with the same IP address and port as the targeted client and perform the rekey using other information which is well known to other valid corporate users. The unscrupulous user could then hijack the session and pose as the targeted client.

IKE version 2 overcomes this problem by modifying the protocol used during key exchanges and authentication. However, IKE version 2 is not entirely compatible with IKE version 1. The techniques of the present invention recognize that it would be beneficial to provide an IKE version 1 solution that would be compatible with existing systems running IKE version 1.

Consequently, the techniques of the present invention provide that a server such as a VPN gateway provide a token to the client during or after generation of secret keys. Only the client and the server would have knowledge of the token. Any protected sequence known and shared by the client and the server used to authenticate a client is referred to herein as a token. In some examples, a token is a randomly generated variable length sequence. In one particular example, the token is 16 to 20 bytes. In some examples, the proof ownership of the token should be as strong as the proof of ownership of the pre-shared secret key.

The token is encrypted by a shared secret or pre-shared secret key so that only the client and the server know the value of the token. According to various embodiments, the token is stored at the server and at the client using VPN client software. The user at the client does not have to perform any intervention when a server prompts a client for new keying material. Security association information and other key generation information is provided along with the token to authenticate the user. An unscrupulous user would no longer be able to hijack the session because the unscrupulous user would have no knowledge of the value of the token. No user intervention is required as the token can be provided automatically by VPN client software. If either the client or the server does not support tokens, tokens will not be exchanged and a conventional IKE version 1 exchange can occur.

FIG. 1 is a diagrammatic representation of a system that can use the techniques of the present invention. The subnetworks 109, 111, and 115 are part of a public network 121. The public network 121 can be connected to a variety of private networks as well as other public networks through different network nodes. For example, the public network 121 is connected to private network 117 through a VPN gateway 107. A destination server 127 is part of the private network 117. The public network 121 is also connected to a destination server 125 as well as to clients 103 and 105.

In one example, a client 103 is a laptop attempting to access a company private network 117 through public network 121 and VPN gateway 107. A client 103 determines the address of the VPN gateway that allows access to the private network 117 typically by using a gateway list. One or more VPN gateways can serve a particular private network. In one example, VPN gateway 107 is the primary gateway and VPN gateway 113 is the secondary gateway. In some instances, multiple VPN gateways are provided to allow load balancing of clients and some fault tolerance. A client selects one or more VPN gateways by using a gateway list and begins to establish a VPN tunnel 123. If one particular gateway is not accessible, another gateway from the gateway list is selected.

To acquire access to destination server 127 in private network 117, a client makes an access request to VPN gateway 107. The client 103 provides information such as its IP address, its user name, and its password. According to various embodiments, the techniques of the present invention work with any handshake mechanism, such as a key exchange, using a physical address associated with a gateway.

The use of the gateway's IP address, encryption, and authentication allow the client 103 to create a VPN tunnel 123 to VPN gateway 107. It should be noted that VPN tunnel 123 is an abstraction depicting the secure traffic flow between client 103 and VPN gateway 107. VPN tunnels will be described in more detail below. Even though the abstraction provides for a VPN tunnel, messages flowing between client 103 and VPN gateway 107 may actually flow through a variety of different network nodes in public network 121. According to various embodiments, nodes on a private network 117 are accessed through VPN tunnel 123 while nodes on public network 121 are accessed directly. According to other embodiments, both nodes on a private network 117 and nodes on a public network 121 are accessed through VPN tunnel 123.

IKE negotiates the IPsec security associations (SAs) between the client 103 and the VPN gateway 107. The IKE key exchange process involves IPsec endpoints that first authenticate themselves and establish IKE shared keys or session keys.

Figure 2:
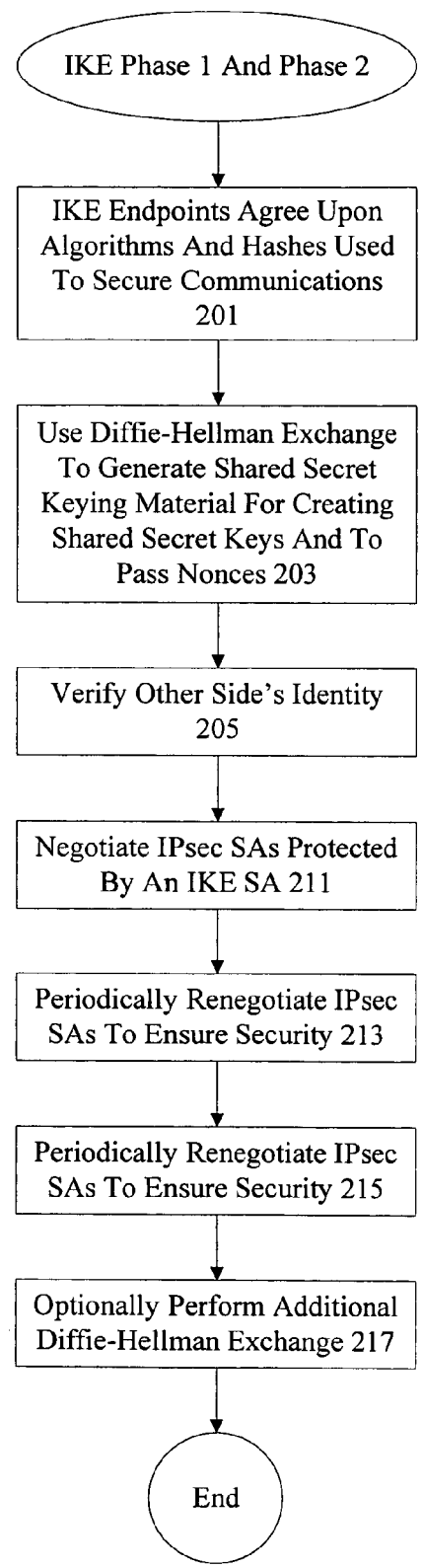
FIG. 2 is a flow process diagram showing IKE phase 1 and phase 2.

FIG. 2 shows examples of IKE phase 1 and phase 2. It should be noted that some variations of IKE phase 1 and phase 2 exist. For example, phase 1 can be run in multiple modes including main and aggressive modes. The following flow process diagram merely depicts one possible flow. In phase 1, IKE creates an authenticated secure connection between two endpoints. A Diffie-Hellman key exchange is performed in this phase. More specifically, in phase 1 at 201, encryption and authentication algorithms used to secure communications between the two IKE endpoints are agreed upon. In one example, the endpoints may agree to use the Data Encryption Standard (DES) and an MD5 hash. At 203, a Diffie-Hellman exchange is performed to provide shared secret keying material to generate shared secret keys. Nonces, or numeric sequences set to the other party, signed, and returned to prove identity are exchanged. At 205, the other side's identity is further verified. In some examples, the identity value is the IPSec peer's IP address in encrypted form. The established IKE SA specifies values for the IKE exchange such as the authentication protocol used, the encryption algorithms, the Diffie-Hellman group, and the lifetime of the IKE SA. IKE has now successfully established a secure tunnel and phase 1 is complete.

In phase two, IKE negotiates the IPsec SAs and generates the required key material for IPSec. At 211, IPsec SAs are negotiated and established. In some examples, endpoints negotiate a shared IPsec policy, derive shared secret keying material used for IPsec security algorithms, and establish IPsec SAs. Nonces that provide replay protection may also be exchanged. The nonces are used to generate new shared secret key material and prevent replay attacks from generating non-authentic SAs. At 213, IPsec SAs are periodically renegotiated to enhance security. At 215, IKE Sas are also periodically renegotiated to enhance security. In some examples, IPsec SAs are renegotiated when the IPSec SA lifetime expires. Endpoints refresh keying material used to create the shared secret key based on the keying material derived from the Diffie-Hellman exchange in phase one. At 217, optional Diffie-Hellman exchanges are performed.

IKE Extended Authentication (Xauth) is an enhancement to the existing Internet Key Exchange (IKE) Protocol. Xauth allows user authentication in a separate phase after the IKE authentication phase 1 exchange. The Xauth feature is an extension to the IKE feature and does not replace IKE authentication. Before Xauth, IKE only supported authentication of the device and not authentication of the user using the device. With Xauth, IKE can authenticate the user of a device after the device has been authenticated during normal IKE authentication. In many implementations, Xauth occurs after IKE authentication phase 1, but before IKE IPSec SA negotiation phase 2.

Figure 3:
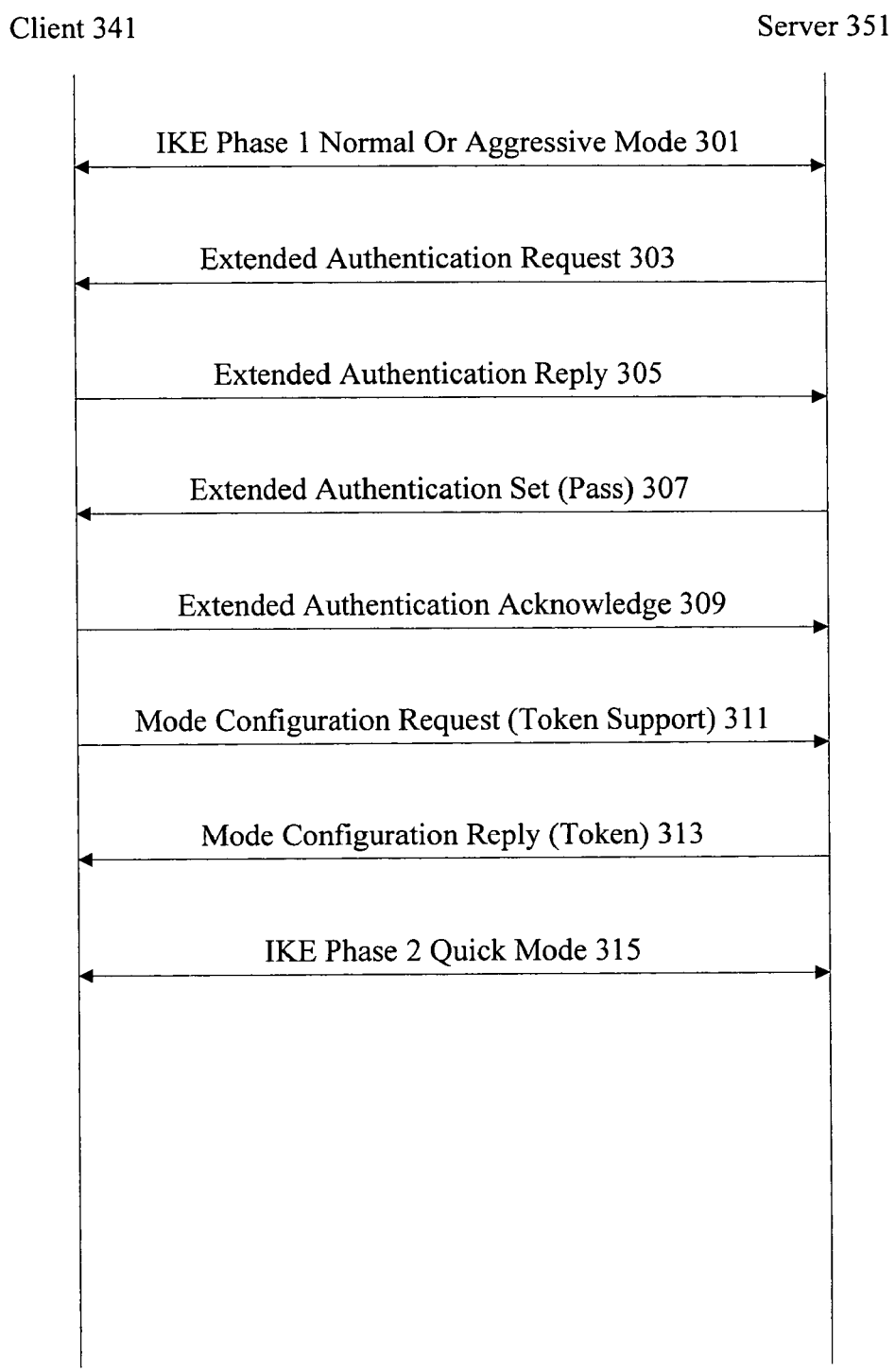
FIG. 3 is an exchange diagram showing initial user authentication.

FIG. 3 is an exchange diagram showing Extended Authentication or initial user authentication. It should be noted that Xauth is itself optional in many systems and is generally performed after IKE phase 1. At 301, IKE phase 1 is performed in normal or aggressive mode. At 303, a server 351 sends an Xauth request to the client 341. The server 351 can be a VPN gateway or other server. The client 341 can be an user connecting to a particular VPN. If the client 341 does not support Xauth, then the session is aborted. However, if the client 341 is configured to use Xauth, an Xauth reply is sent at 305. The server 351 then sends an Xauth_set pass 307 message to the client 341. The client 341 responds with an acknowledgment 309. According to various embodiments, the server 351 can give the client 341 a token during the Xauth phase, for example, in the Xauth_set pass 307 message. However in order for the server to know whether the client 341 supports tokens, the client 341 would have to indicate this support in some manner. A version identifier or some other indicia or flag would have to be introduced.

In one example, an easy way to avoid version identifiers is to have the client 341 request the token during the mode-configuration exchange. A client 341 could make an explicit request and indicate support for the feature at the same time. In one example, a client 341 sends a mode-configuration-request message 311 that indicates support for tokens by providing a token having a length of 0 bytes. In some examples, a server 351 that supports tokens will respond with a mode-configuration-reply with a token of variable length. The client 341 now has a token that it can use to verify its identity to the server at a later time. According to various embodiments, the token provided to the client 341 is encrypted using pre-shared secret keys. In typical examples, the token is generated by a strong random number generator and should not be derived from previous information. Consequently, the token is known only by the client 341 and the server 351. In typical implementations, the token is stored by both the client 341 and the server 351 for future use in authenticating the client 341. After the token is provided to the client 341, IKE quick mode phase 2 proceeds at 315.

Figure 4:
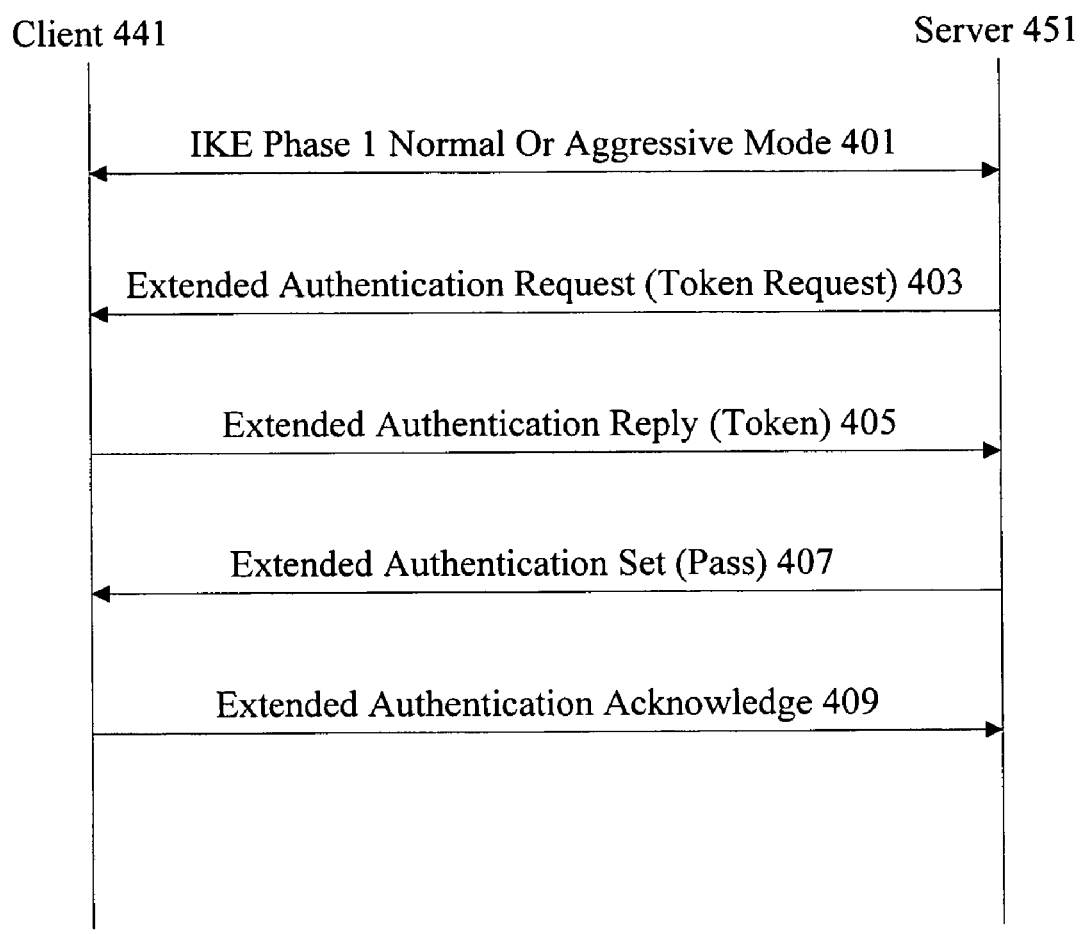
FIG. 4 is an exchange diagram showing rekey.

FIG. 4 is an exchange diagram showing rekey. In order to provide enhanced security, it is typically desirable to periodically change session keys. At 401, IKE phase 1 is performed in normal or aggressive mode. Prior to changing session keys, peers negotiated new session keys and then use Xauth to authenticate the user. However, repeatedly providing user credentials can be burdensome and inefficient. According to various embodiments, the techniques of the present invention allow a user to bypass Xauth on a rekey. Instead of providing user credentials to verify user identity, the stored token can be automatically provided instead. The server 451 requests the token by sending an Xauth request with a token request 403 to the client 441. If the client also supports bypass and the system is configured to allow the user to bypass Xauth on rekey, the token can be provided in an Xauth reply 405. Xauth can then proceed to an Xauth set pass 407 and an Xauth acknowledgment 409. If the client does not support tokens, then rekey could proceed like a typical IKE rekey possibly followed with a typical Xauth exchange.

If the client 441 is asked for the token, and the client 441 responds with no token or an invalid token, then the IKE SA and all IPsec SAs are torn down. According to various embodiments, if a token fails, the client 441 is not given a second chance to fall back to entering user credentials. It is recognized that token verification should not fail since the user is not involved in the process. Giving additional chances to guess a token adds unnecessary risk.

The techniques of the present invention allow additional security without requiring user involvement. Selective clients and servers can also be updated at different times without adversely affecting system performance.

Figure 5:
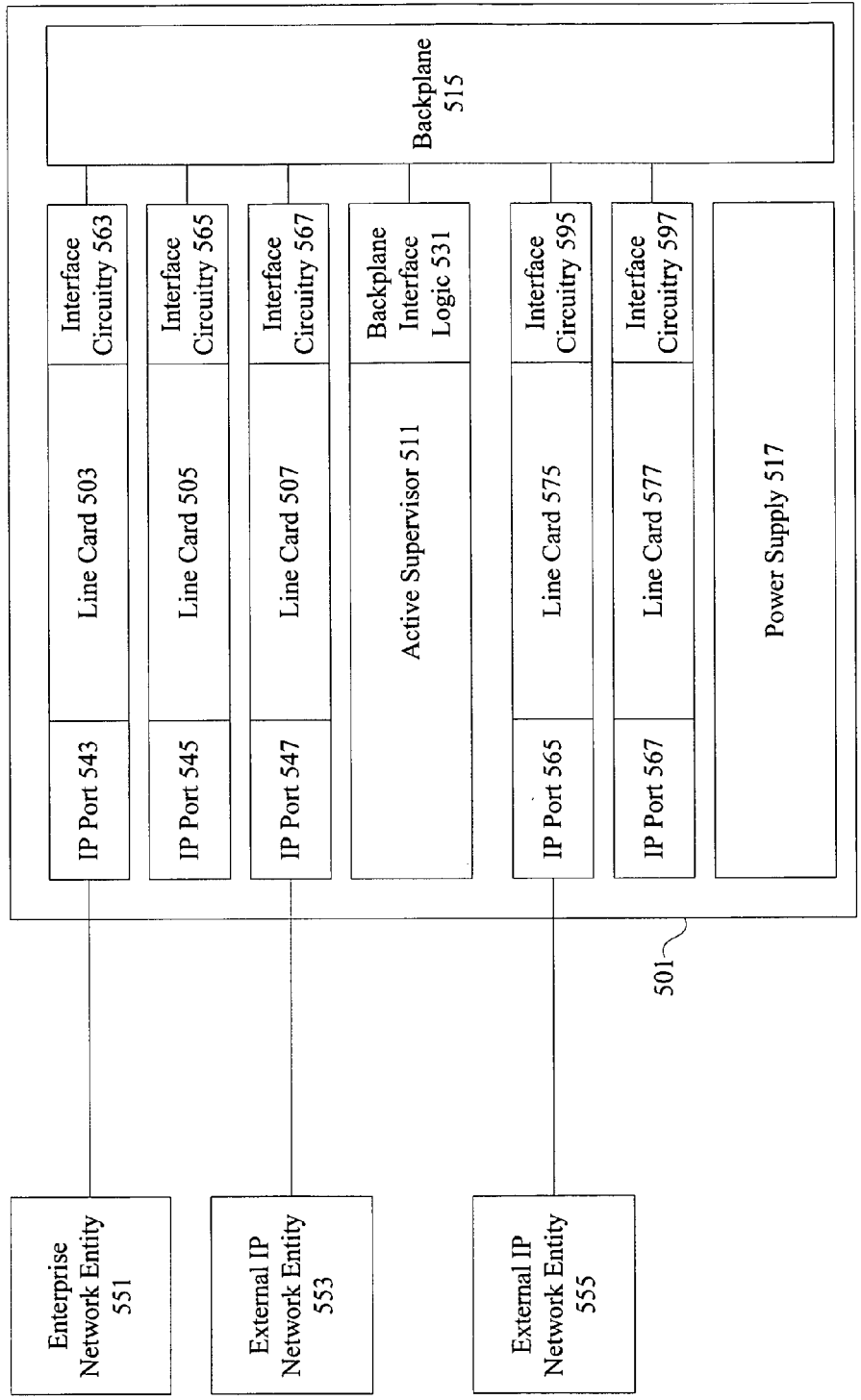
FIG. 5 is a diagrammatic representation of a server that can use the techniques of the present invention.

FIG. 5 is a diagrammatic representation of one example of a device that can be used to implement techniques of the present invention. Although one particular configuration will be described, it should be noted that a wide variety of switches and network devices are available. According to various embodiments, the gateway 501 is connected to an enterprise network and an external IP network. Gateway 501 may also operate as a router or a switch. The gateway 501 may include one or more supervisors 511. According to various embodiments, the supervisor 511 has its own processor, memory, and storage resources.

Line cards 503, 505, and 507 can communicate with an active supervisor 511 through interface circuitry 583, 585, and 587 and the backplane 515. According to various embodiments, each line card includes a plurality of ports that can act as either input ports or output ports for communication with network entities 551 and 553. In one example, line card 503 is connected to an enterprise network entity such as a router associated with a private, corporate network. The backplane 515 can provide a communications channel for all traffic between line cards and supervisors. Individual line card 503 is coupled to an enterprise network entity 551 through port 543. Line card 507 is coupled to an external IP network entity 553 such as an Internet router through IP port 547.

It should be noted that the switch can support any number of line cards and supervisors. In the embodiment shown, only a single supervisor is connected to the backplane 515 and the single supervisor communicates with many different line cards. The active supervisor 511 may be configured or designed to run a plurality of applications such as routing, domain manager, system manager, and utility applications.

According to various embodiments, the switch also includes line cards 575 and 577 with IP interfaces 565 and 567. In one example, the IP port 565 is coupled to an external IP network entity 555. According to various embodiments, each IP line card includes a plurality of ports that can act as either input ports or output ports for communication with external IP entities 555. These IP entities could be IP switches or routers, or directly attached network endnodes. The IP entities may also be devices that allow formation of VPN tunnels from clients to the gateway 501. The line cards 575 and 577 can also be coupled to the backplane 515 through interface circuitry 595 and 597.

In addition, although an exemplary switch is described, the above-described embodiments may be implemented in a variety of network devices (e.g., servers) as well as in a variety of mediums. For instance, instructions and data for implementing the above-described invention may be stored on a disk drive, a hard drive, a floppy disk, a server computer, or a remotely networked computer. Accordingly, the present embodiments are to be considered as illustrative and not restrictive, and the invention is not to be limited to the details given herein, but may be modified within the scope and equivalents of the appended claims.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as optical disks; and hardware devices that are specially configured to store and perform program instructions, such as read-only memory devices (ROM) and random access memory (RAM). The invention may also be embodied in a carrier wave travelling over an appropriate medium such as airwaves, optical lines, electric lines, etc. Examples of program instructions include both machine code, such as produced by a compiler, and files containing higher level code that may be executed by the computer using an interpreter.

While the invention has been particularly shown and described with reference to specific embodiments thereof, it will be understood by those skilled in the art that changes in the form and details of the disclosed embodiments may be made without departing from the spirit or scope of the invention. For example, embodiments of the present invention may be employed with a variety of network protocols and architectures. It is therefore intended that the invention be interpreted to include all variations and equivalents that fall within the true spirit and scope of the present invention.

What is claimed is:

1. A server for performing extended authentication, the system comprising:
   a network interface operable to transmit to a client device an extended authentication request associated with an Internet Key Exchange (IKE) phase 1 exchange and receive from the client device an extended authentication reply along with a token request;
   a network interface operable to receive from the client device a token support indicator, wherein the token support indicator specifies that the client device is configured to support a token for extended authentication;
   a processor operable to generate the token, wherein the token is maintained at the server and the client device and provides proof of identity of a user of the client device and wherein the token, when maintained at the server and the client device, further allows periodic change of a session key without prompting the user for user credentials and while preventing session-hijacking attacks.

2. The server of claim 1, wherein the network interface is further operable to provide an extended authentication set after receiving the extended authentication reply.

3. The server of claim 1, wherein the network interface is further operable to receive an extended authentication acknowledgment.

4. The server of claim 1, wherein the token can be used for an indefinite period of time.

5. The server of claim 1, wherein the token can be voided at any time by the server.

6. The server of claim 1, wherein the network interface receives the token request in a mode configuration request message sent from the client to the server.

7. The server of claim 6, wherein the network interface receives the token in a mode configuration reply.

8. The server of claim 7, wherein the network interface exchanges IP Security (IPSec) security associations after the token is provided by the server.

9. The server of claim 1, wherein the network interface is further operable to transmit a subsequent extended authentication request from the server.

10. The server of claim 9, wherein the network interface is further operable to receive an extended authentication, wherein the extended authentication reply includes the token provided by the server during the mode configuration reply.

11. The server of claim 10, wherein providing the token allows generation of a new key without having to prompt a user for user credentials.

12. The server of claim 10, wherein providing the token allows generation of a new key while allowing administrators to refresh the keying material without prompting the user and while preventing session-hijacking attacks.

13. A method for bypassing extended authentication during a rekey of a secure session, the method comprising:
   receiving an extended authentication request from a server at a client device, the extended authentication request associated with an Internet Key Exchange (IKE) version 1 phase 1 exchange;
   responding with an extended authentication reply to the server;
   providing a token request to the server;
   providing a token support indicator to the server, wherein the token support indicator specifies that the client device is configured to support a token for bypassing extended authentication;
   receiving the token from the server during or after initial client authentication, wherein the token is stored both at the client device and the server and is operable to provide proof of identity of a user of the client device and wherein the token, when stored at the server and the client device, further allows periodic change of a session key without prompting the user for user credentials and while preventing session-hijacking.

14. The method of claim 13, further comprising receiving an extended authentication set from the server after responding with the extended authentication reply.

15. The method of claim 13, further comprising sending an extended authentication acknowledgment to the server.

16. The method of claim 13, wherein the token request is provided during a mode configuration request message sent from the client to the server.

17. The method of claim 16, wherein the token is provided by the server during a mode configuration reply.

18. The method of claim 17, wherein IP Security (IPSec) security associations are exchanged after the token is provided by the server.

19. The method of claim 13, further comprising receiving a subsequent extended authentication request from the server;

20. The method of claim 19, further comprising responding with an extended authentication reply to the server, wherein the extended authentication reply includes the token provided by the server during the mode configuration reply.

21. The method of claim 20, wherein providing the token allows generation of a new key without having to prompt a user for user credentials.

22. The method of claim 20, wherein providing the token allows generation of a new key to allow administrators to refresh the keying material and prevent session-hijacking attacks without prompting the user.

23. A non-transitory computer readable storage medium having computer code embodied therein, the non-transitory computer readable storage medium comprising:

computer code for receiving an extended authentication request from a server, the extended authentication request associated with an Internet Key Exchange (IKE) phase 1 exchange;

computer code for responding with an extended authentication reply to the server;

computer code for providing a token request to the server;

computer code for providing a token support indicator to the server, wherein the token support indicator specifies that a client device is configured to support a token for extended authentication;

computer code for receiving the token from the server during or after initial client authentication, wherein the token is stored both at the client device and the server and is operable to provide proof of identity of a user of the client device and wherein the token, when stored at the server and the client device, further allows periodic change of a session key without prompting the user for user credentials and while preventing session-hijacking.

24. The server of claim 1, wherein the token is encrypted with a pre-shared secret key.

25. The server of claim 1, wherein the token is encrypted with a shared secret key.

26. The server of claim 1, wherein the token is generated by a random number generator.

27. The server of claim 1, wherein the token is of variable length.

28. The server of claim 6, wherein the network interface receives the token support indicator in the mode configuration request message.

29. The server of claim 28, wherein the token support indicator is zero bytes.

\* \* \* \* \*